May 7, 1963  M. KOULICOVITCH  3,089,133
DYNAMIC CODERS
Filed March 1, 1960  8 Sheets-Sheet 1

May 7, 1963    M. KOULICOVITCH    3,089,133
DYNAMIC CODERS
Filed March 1, 1960    8 Sheets-Sheet 2
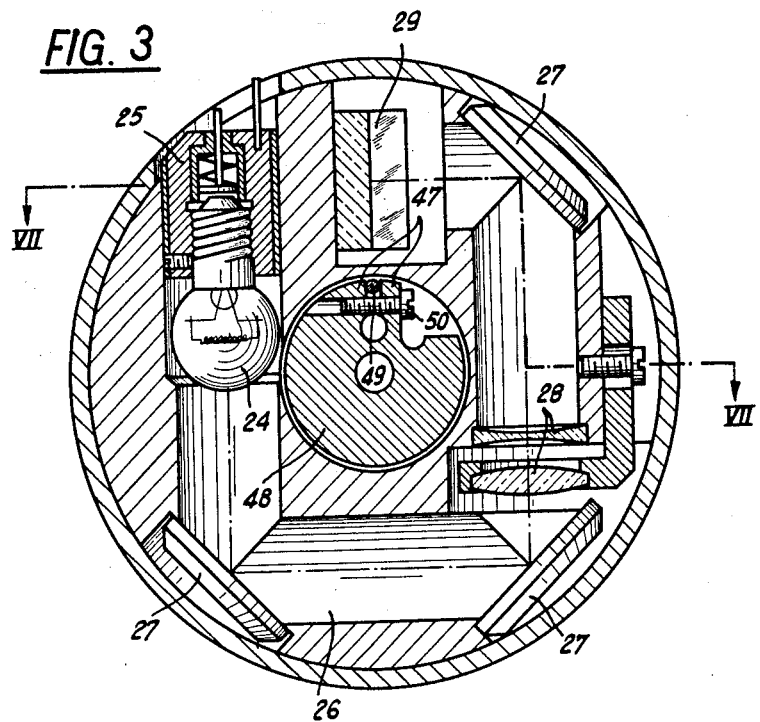
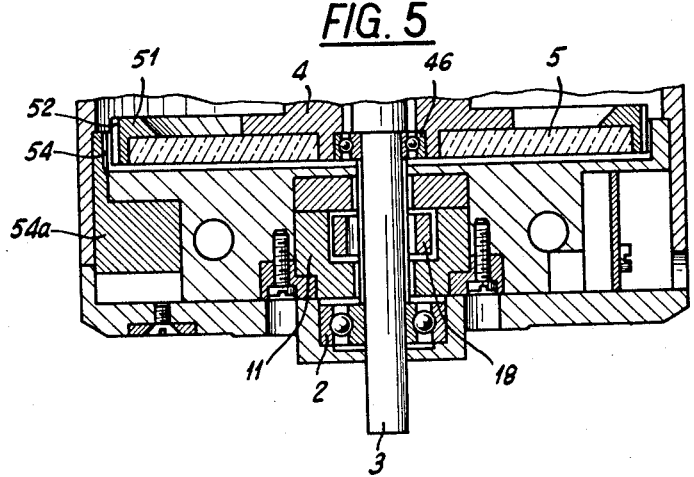

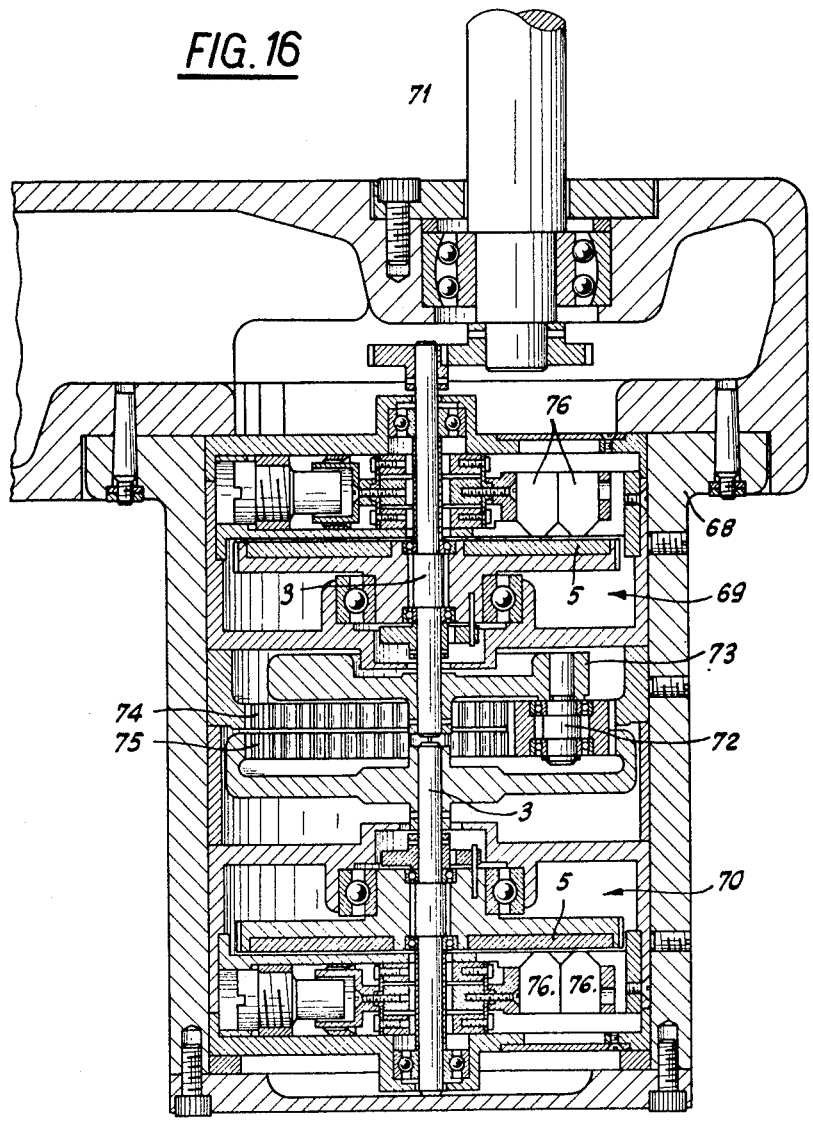

United States Patent Office 3,089,133
Patented May 7, 1963

3,089,133
DYNAMIC CODERS
Maurice Koulicovitch, Geneva, Switzerland, assignor to Société Genevoise d'Instruments de Physique, a firm of Switzerland
Filed Mar. 1, 1960, Ser. No. 12,178
Claims priority, application Switzerland Mar. 6, 1959
8 Claims. (Cl. 340—347)

This invention relates to a coder adapted to convert an analogic indication into a numerical indication and comprising a graduated member and a reading member moving relatively to one another.

My invention has for its object a coder which allows a direct counting of the pulses defining the angular position of a rotary member. To this end, I provide at least one series of tracks on a rotary disc or the like movable member driven by said rotary member, while scanning means such as photo-cells are caused to travel at a high reciprocatory speed across said series of tracks to count the number of code lines registering with the scanning means along lines extending transversely of the track, say along successive radii of the rotary disc.

Furthermore, my invention has for its object means for removing any uncertainty or doubt as to the presence or absence of a pulse at the beginning of a group of tracks.

The invention will now be described in more detail with reference to the accompanying drawings, in which:

FIGURES 2, 3 and 4 are sections along lines II—II, III—III, and IV—IV, respectively, of FIGURE 1.

FIGURES 5 and 6 are sections along lines V—V and VI—VI, respectively, of FIGURE 2.

FIGURE 16 shows a transverse section of the second embodiment.

In the first embodiment, the coder comprises a casing 1 through which is pivoted by means of two bearings 2 a shaft 3 driven in rotation by a movable part, not shown, the displacement of which is to be measured. It may for example be the slide of a machine tool.

Figure 8:
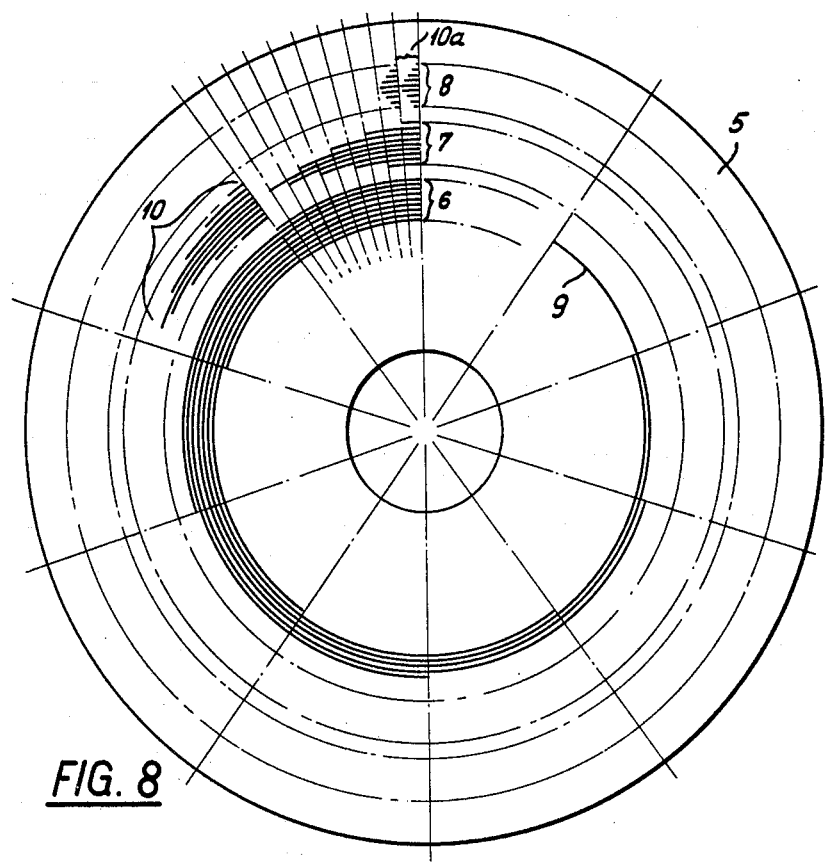
FIGURE 8 shows the graduation of the coder and FIGURE 9 is a view on a larger scale of part of this graduation.
Figure 9:
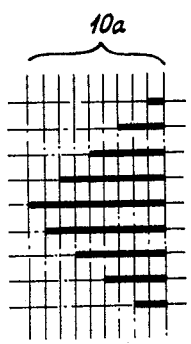

The said shaft carries an annular fitting 4 in a recess of which is housed a transparent graduated disc 5. The graduation shown in FIGURES 8 and 9 comprises three concentric zones 6, 7 and 8. The first contains a group of nine opaque tracks on a transparent ground (or vice-versa), one (9) of which is marked on 9/10 of the circumference and each of the following on 1/10 less than the preceding one. The second zone 7 contains ten groups 10 of nine tracks, each group extending over one-tenth of the circumference, and the third zone one hundred groups 10a of nine tracks equally. This graduation thus divides the disc into a thousand units, decimal system, the first zone indicating the tens, the second the hundreds and the third the thousands.

Figure 6:
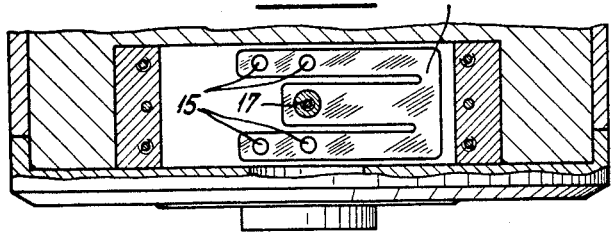

Two parts 11 and 12 constitute a fitting held vertically in the body of the casing by springs 13 and regulating screws 14. The part 11 carries, fixed by screws 15, two elastic blades 16 (FIGURE 6) on which is suspended at 17 a support 18 carrying at its upper end a group of photo-electric cells 20 and at its lower end a coil 21 which is subject to the field of a permanent magnet 22 housed in the part 12 and is fed with alternating current. This coil imparts to the support a reciprocating motion of 50 periods per second, for example, the amplitude of which allows each cell to scan transversely one zone of the graduation of the disc 5. This motion is limited by a stop 19 housed in a core 23 screwed into the part 12. In other words, the photo-cells 20 rigid with the support 18 are subjected through the interaction between the permanent magnet 22 and the coil 21 fed with A.C. impulses, to a reciprocatory motion, as well known in the art, the amplitude of said motion being adjusted through the screwing and unscrewing of the core 23.

Figure 7:
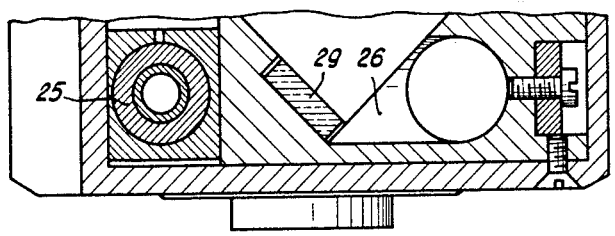
FIGURE 7 is a section along line VII—VII of FIGURE 3.
Figure 4:
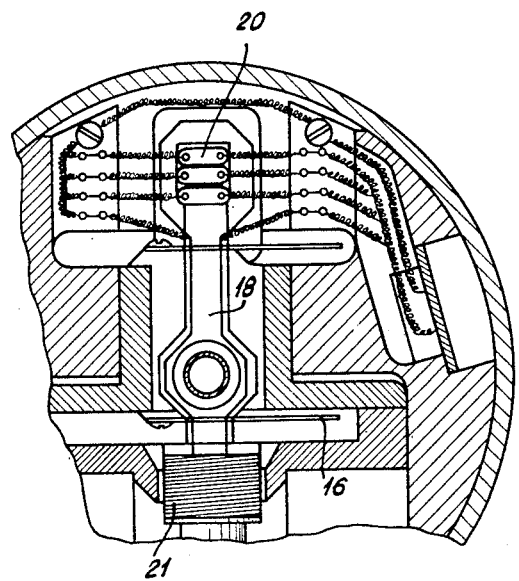

The graduation is projected on to the said photo-electric cells by a light bulb 24, screwed into a socket 25, mounted in the casing, the light from which passes through an optical system partly housed in a passage 26 extending parallel with the disc (FIGURES 3 and 7). This passage contains three plane mirrors 27 and a condenser 28 formed by two lenses. 29 is a mirror inclined at 45° and reflecting the light through the disc and perpendicularly to the latter on to the photo-electric cells.

On each scanning, viz. one hundred times per second, the cells transmit as many electric impulses as they come into contact with transparent tracks. For each cell these impulses are directed towards an impulse counter, not shown, provided with a device for automatic return to zero after each scanning. These counters thus indicate continuously the number of tracks met with, that is to say the portion of the graduation observed and hence the position of the latter in relation to the cells. The coder thus converts an analogic indication into a numerical indication.

The part carrying this graduation might just as well be a rule undergoing a rectilinear motion.

Figure 11:
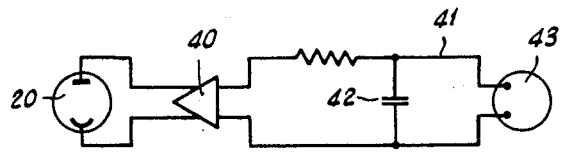
FIGURES 11 and 12 show wiring diagrams relating to the measuring devices associated with the coder.
Figure 12:
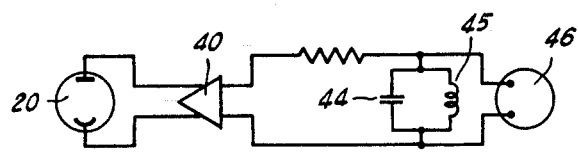

In the first modification of the measuring device shown in FIGURE 11, the impulses from each photo-electric cell 20 are directed on to an amplifier 40 and then to a circuit 41, where they arrive in the form of a modulated electric current, the alternating component of which is filtered by a condenser 42 and the direct component of which controls a measuring device 43, an ammeter for example. The magnitude of the intensity or the voltage of the current being proportional to the number of impulses, the device thus gives an indication corresponding to the position of this graduation. In the second modification (FIGURE 12), the impulses are directed on to a resonant circuit comprising a condenser 44 and a self-induction coil 45 both mounted in parallel and producing an alternating current. The latter, the magnitude of which is likewise proportional to the number of impulses, controls a measuring device 46.

Figure 10:
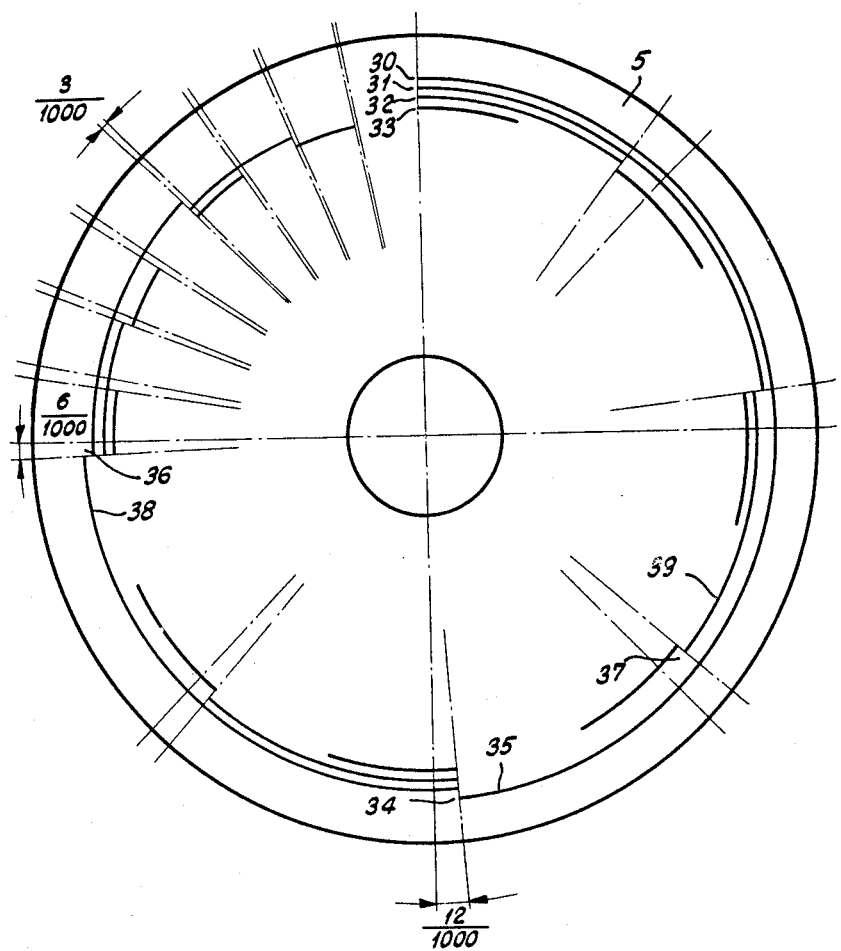
FIGURE 10 shows an alternative form of the graduation.

In the modification shown in FIGURE 10, the graduation is based on the dual system. It contains 10 concentric tracks, only the first four, 30, 31, 32 and 33, of which are shown. Each of them is subdivided into $2^n$ segments with $n=1$ for the first track and $n$ increasing by one unit for each of the following tracks. These segments are alternately marked and blank in each track. Thus the first track is subdivided into two segments 34 (blank) and 35 (marked), the second track into four segments 36 and 37 (blank) and 38 and 39 (marked), and finally the last, not shown, into $2^{10}$ that is 1024 segments. To obtain a graduation indicating 1/1000 and not 1/1024 of the circumference, each segment is extended by $24/1000 \cdot 2^n$ of this circumference. Thus, the segment 34 of the first track is extended by 12/1000, segments 36, 37 and 38 of the second track by $6/1000$ each, those of the third track by $3/1000$ each and finally those of the tenth and last track by $24/1000 \cdot 1024$ each.

Naturally graduations comprising a different number of zones, groups or tracks could be provided.

Figure 13:
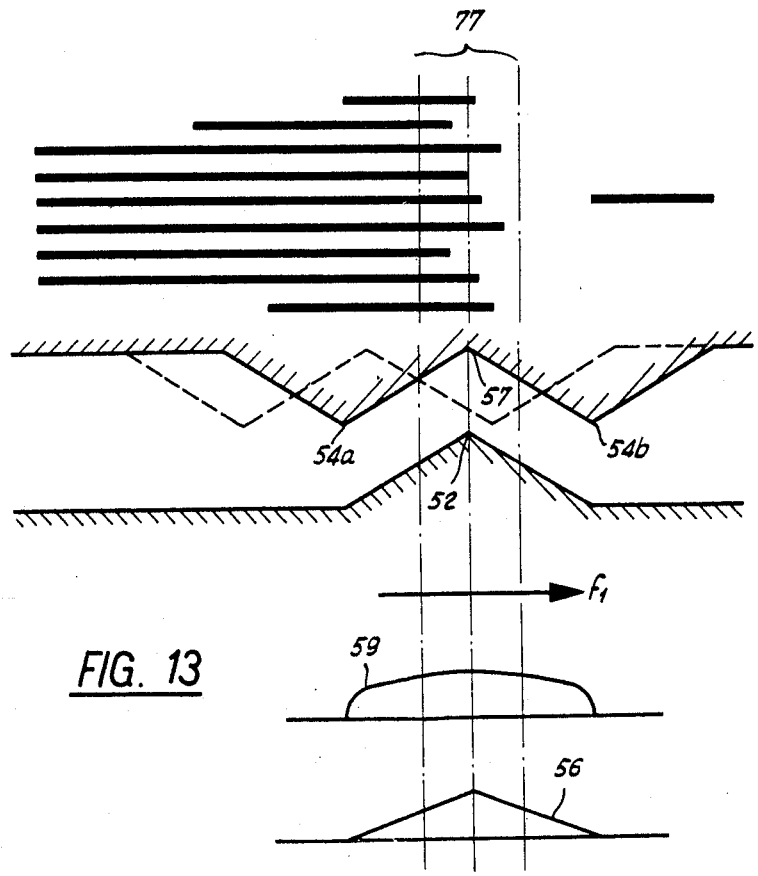
FIGURE 13 illustrates the functioning of the doubt-removing device used in both embodiments.

Owing to manufacturing contingencies the graduation comprises zones of uncertainty 77, in which at least two tracks stop theoretically at the same level. FIGURE 13 shows that in these zones the reading member, which should scan either zero or nine tracks, may scan any number comprised between these two figures and thus give a false indication as to the portion of the graduation observed. Thus, the graduation shown in FIGURE 8 comprises one hundred zones of uncertainty, that is to say one between each group in the zone 8. To remedy this defect, the coder is provided with a so-called doubt-removing device which prevents the graduation being read in these zones of uncertainty, by automatically moving back or advancing the reading member with respect to the graduation, so that it must always read the latter beyond or short of the said zones, that is to say in excess or by default.

Figure 1:
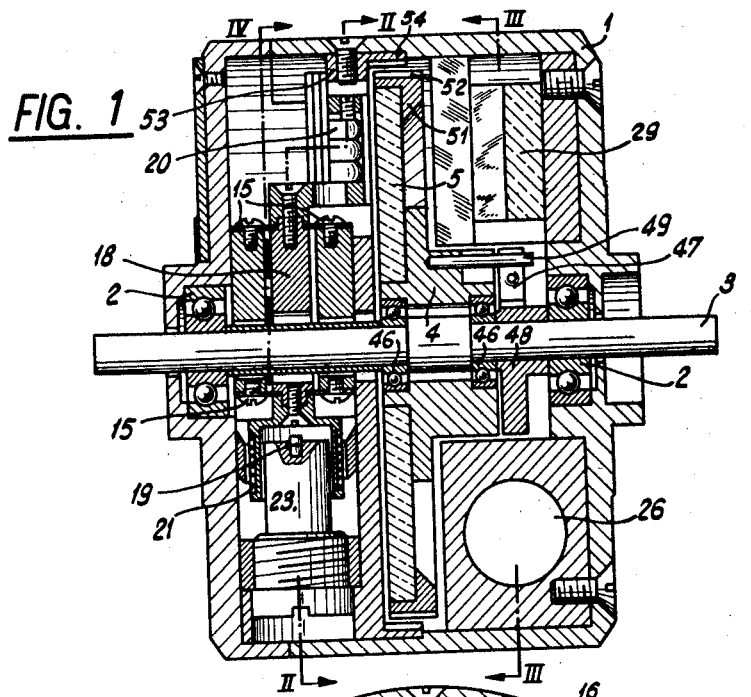
FIGURE 1 is a transverse section of one embodiment of the invention.
Figure 2:
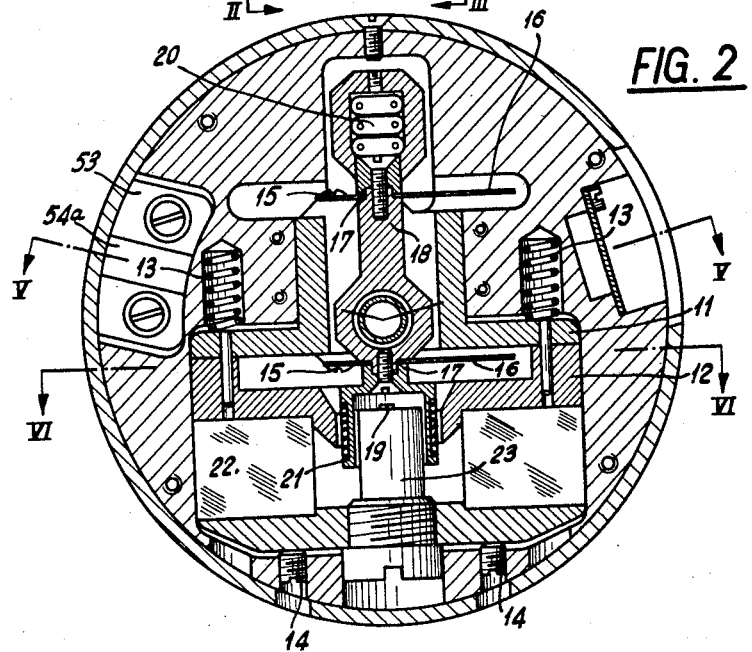

For this purpose the fitting 4 carrying the disc 5 is pivoted on the shaft 3 by means of two bearings 46 (FIGURE 1) and its rotary movement is limited to an extent corresponding to the length of the zones of uncertainty by two stops 47 (FIGURE 3)—the latter are cut into a ring 48 fitted on the shaft and co-operating with an elastic finger 49 mounted in the fitting 4. The space between them may be regulated by a screw 50. This disc is surrounded by a toothed ring 51, of soft iron, the teeth 52 of which have a pitch approximately equal to $1/1000$ of the circumference and are one hundred in number, that is to say one per zone of uncertainty. These teeth are subject to the action of a sector 53 fixed to the casing and the teeth 54 of which are rendered magnetic by a permanent magnet 54a. This magnetic set of teeth comprises at least two hundred teeth having a pitch corresponding to that of the teeth 52 and performs the function of an elastic return means.

Each time a tooth 52, driven by the disc, moves away from a tooth 54a, for example in the direction of the arrow $f_1$, the latter tends to retain the disc against the elastic finger 49 which stretches as shown in the diagram 56. The reading then takes place by default. When the point of the tooth 52, corresponding to the central part of the zone of uncertainty, passes beyond the root 57, it ceases suddenly to be retained by the tooth 54a and is attracted by the tooth 54b. It thus causes the disc to jump by the amount of its stroke and stretches the finger 49 in the opposite direction; the reading then takes place in excess. The reading member is thus prevented from stopping in front of the zone of uncertainty. The curve 59 represents the diagram of forces of a device having a rigid finger instead of an elastic one. Through this arrangement, the rotary disc being provided with peripheral teeth 52 in registry with each area of uncertainty, the pitch of which is equal to the smallest code subdivision, each of said teeth faces the gap between two cooperating magnetic stationary teeth 54. Thus the tooth 52 is held in position magnetically ahead of the area of uncertainty and the disc will move only when the torque exerted on it rises above the magnetic force holding it in position. As soon as said torque is sufficient, the code disc is shifted by one interval so that the tooth engages the opposite magnetic tooth, as clearly shown in diagrammatic FIG. 13. This transient standstill is allowed by the elastic coupling illustrated in FIG. 3 between the stud 49 on the disc and the stops 47 rigid with the driving shaft and the spacing of which is adjustable. Consequently, the disc always stops ahead of an area of uncertainty in a position for which a tooth 52 registers with one tooth 54 and then jumps into registry with the next tooth 54 so that the area of uncertainty is thus rendered inoperative.

Figure 14:
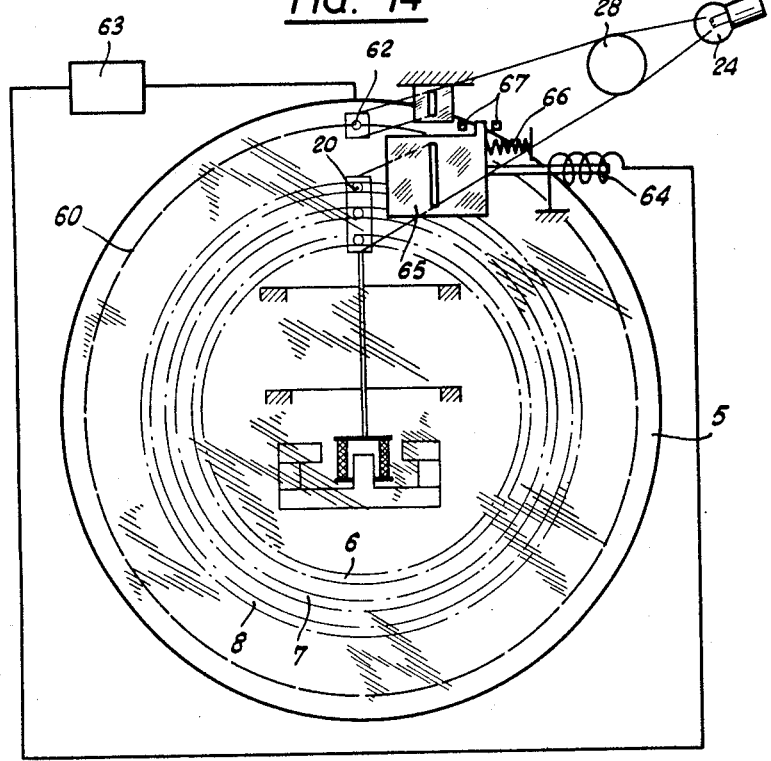
FIGURE 14 is a diagrammatic view of another doubt-removing device and FIGURE 15 shows a detail from FIGURE 14.
Figure 15:
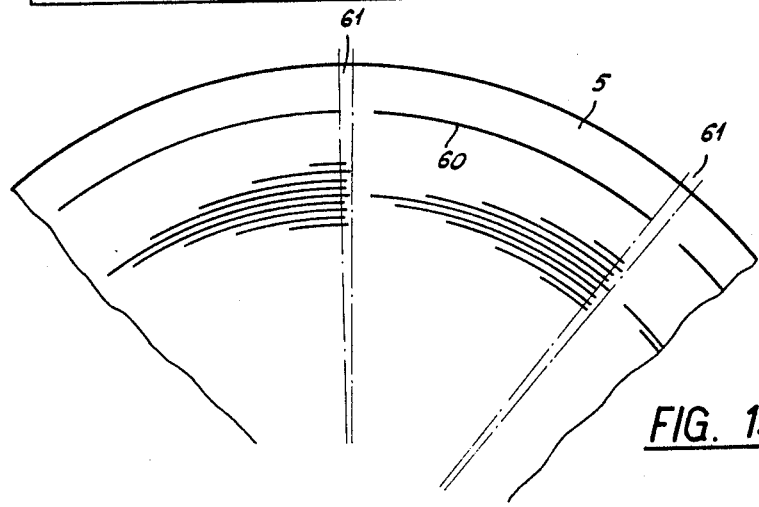

In the modification shown diagrammatically in FIGURES 14 and 15, 20 represents the photo-electric cells of the reading member, 5 the graduated disc, 24 the electric light bulb and 23 a light condenser. The disc has an additional track 60 comprising a break in continuity 61 along each zone of uncertainty. This track is scanned by an independent reading member 62, actuating through a relay 63 an electro-magnet which in turn controls a movable diaphragm 65. The latter is subject to the action of a return spring 66 and its travel, corresponding to the length of the zones of uncertainty, is limited by two stops 67. Each time the member 62 approaches a zone 61 it drives the electro-magnet which causes the diaphragm 65 to jump; the cells 20 then read the graduation either in excess or by default, according to the direction of rotation of the disc.

In the second embodiment shown in FIGURE 16, the coder comprises a frame 68 in which are mounted two coders 69 and 70, the shafts 3 of which are connected to one another by a gear, the first being driven by an axle 71 actuated by the movable part, the displacement of which is to be measured. This gear includes a wheel 73 rigid with the shaft 3 and carrying a planet wheel 72 engaging, on the one hand, an inwardly toothed ring rigid with the frame and coaxial with the shaft 3 and, on the other hand, a toothed wheel 75 rigid with the lower shaft 3′ aligned with the upper shaft 3. The ring 74 carries 100 teeth and the wheel 75 carries 101 teeth, so that the speed reduction of the sun-and-planet gear 72—74—75 is equal to 1:100. This arrangement forms a speed reducer, whereby the upper disc 5 provides information for each separate revolution, while the lower disc 5′, the speed reduction of which is equal to 1:100 counts the number of revolutions.

The reading members each comprise two magnetic heads 76 arranged opposite magnetic graduations printed on the rotary discs 5, which are of non-magnetic material. Each graduation thus comprises two track zones and indicates the hundredth; the two coders thus together indicate the $1/10000$.

I claim:

1. An apparatus for converting analogic information into numerical information, comprising a movable track carrier provided with at least one group of parallel code tracks, and with an additional track interrupted in registry with each area of the carrier corresponding to an uncertain reading of said code tracks, means driving said carrier in accordance with the information to be converted, scanning means adapted to be shifted at a high speed across each group of code tracks, scanning means for said additional track, electromagnetic means controlled by last-mentioned scanning means, a movable diaphragm shifted transiently by said electromagnetic means in front of the first-mentioned scanning means to prevent its operation during the passage of said area of uncertainty across the scanning means, and indicating means controlled by said scanning means.

2. An apparatus for converting analogic information into numerical information, comprising a rotary track carrier provided with at least one group of arcuate code tracks coaxial with the carrier, means driving said carrier in accordance with the information to be converted, means allowing a slight elastic shifting between the carrier and the driving means, scanning means adapted to be shifted at a high speed across each group of code tracks indicating means controlled by said scanning means, and means for biasing the carrier to keep the scanning means away from the center of any area of uncertain reading of the code tracks.

3. An apparatus for converting analogic information into numerical information, comprising a movable track carrier provided with at least one group of arcuate code tracks coaxial with the carrier, means driving said carrier in accordance with the information to be converted, a resilient projection carried by the carrier, stops carried by said driving means to either side of said projection with a slight clearance with reference thereto, means for adjusting the clearance between said stops and projection, scanning means adapted to be shifted at a high speed across each group of code tracks, means for biasing the carrier to keep the scanning means away from the center of any area of uncertain reading of the code tracks, and indicating means controlled by said scanning means.

4. An apparatus for converting analogic information into numerical information, comprising a movable track carrier provided with at least one group of arcuate code tracks coaxial with the carrier, means driving said carrier in accordance with the information to be converted, means allowing a slight elastic shifting between the carrier and the driving means, scanning means adapted to be shifted at a high speed across each group of code tracks, indicating means controlled by said scanning means, magnetizable teeth at the periphery of the carrier, and a pair of stationary magnetized teeth registering respectively with a first point just ahead of the location of a magnetizable tooth each time the scanning means are about to register with an area of uncertain reading of the code tracks and with a point just beyond said first point in the direction of movement of the carrier, to produce a sudden shifting of the uncertain areas across the location of the scanning means.

5. An apparatus for converting analogic information into numerical information, comprising a rotary track carrier provided with at least one group of arcuate code tracks coaxial with the carrier, means driving said carrier in accordance with the information to be converted, means allowing a slight elastic shifting between the carrier and the driving means, scanning means adapted to be shifted at a high speed across each group of code tracks, indicating means controlled by said scanning means, and means for biasing the driving means to keep the scanning means away from the center of any area of uncertain reading of the code tracks.

6. An apparatus for converting analogic information into numerical information, comprising a movable track carrier provided with at least one group of arcuate code tracks coaxial with the carrier, means driving said carrier in accordance with the information to be converted, a resilient projection carried by the carrier, stops carried by said driving means to either side of said projection with a slight clearance with reference thereto, means for adjusting the clearance between said stops and projection, scanning means adapted to be shifted at a high speed across each group of code tracks, means for biasing the driving means to keep the scanning means away from the center of any area of uncertain reading of the code tracks, and indicating means controlled by said scanning means.

7. An apparatus for converting analogic information into numerical information, comprising a movable track carrier provided with at least one group of arcuate code tracks coaxial with the carrier, means driving said carrier in accordance with the information to be converted, a resilient projection carried by the driving means, stops carried by said driving means to either side of said projection with a slight clearance with reference thereto, means for adjusting the clearance between said stops and projection, scanning means adapted to be shifted at a high speed across each group of code tracks, means for biasing the carrier to keep the scanning means away from the center of any area of uncertain reading of the code tracks, and indicating means controlled by said scanning means.

8. An apparatus for converting analogic information into numerical information, comprising a movable track carrier provided with at least one group of arcuate code tracks coaxial with the carrier, means driving said carrier in accordance with the information to be converted, a resilient projection carried by the driving means, stops carried by said driving means to either side of said projection with a slight clearance with reference thereto, means for adjusting the clearance between said stops and projection, scanning means adapted to be shifted at a high speed across each group of code tracks, means for biasing the driving means to keep the scanning means away from the center of any area of uncertain reading of the code tracks, and indicating means controlled by said scanning means.

References Cited in the file of this patent
UNITED STATES PATENTS

| | | |
|---|---|---|
| 2,679,644 | Lippel et al. | May 25, 1954 |
| 2,707,212 | Hickey | Apr. 26, 1955 |
| 2,734,188 | Jacobs | Feb. 7, 1956 |
| 2,779,539 | Darlington | Jan. 29, 1957 |
| 2,900,629 | Daniels | Aug. 18, 1959 |